(12) United States Patent
Henry

(10) Patent No.: US 11,277,582 B2
(45) Date of Patent: Mar. 15, 2022

(54) MOUNTABLE VIDEO PLAYER APPARATUS

(71) Applicant: Stephanie J. Henry, Goochland, VA (US)

(72) Inventor: Stephanie J. Henry, Goochland, VA (US)

( * ) Notice: Subject to any disclaimer, the term of this patent is extended or adjusted under 35 U.S.C. 154(b) by 8 days.

(21) Appl. No.: 16/916,312

(22) Filed: Jun. 30, 2020

(65) Prior Publication Data

US 2021/0409639 A1    Dec. 30, 2021

(51) Int. Cl.
*H04N 5/72* (2006.01)
*H04N 5/645* (2006.01)
*H04N 5/63* (2006.01)
*H04N 5/64* (2006.01)
*G11B 33/04* (2006.01)

(52) U.S. Cl.
CPC ............. *H04N 5/645* (2013.01); *G11B 33/04* (2013.01); *H04N 5/63* (2013.01); *H04N 5/642* (2013.01)

(58) Field of Classification Search
None
See application file for complete search history.

(56) References Cited

U.S. PATENT DOCUMENTS

| 8,503,857 | B2 | 8/2013 | Sikorski | |
|---|---|---|---|---|
| 9,415,621 | B2 | 8/2016 | Fahrer | |
| D822,106 | S | 7/2018 | Mahbubani | |
| 2003/0170604 | A1* | 9/2003 | Mullen | B42D 3/123 434/317 |
| 2008/0046818 | A1 | 2/2008 | Drgill | |
| 2011/0066945 | A1 | 3/2011 | Lee | |
| 2012/0321272 | A1 | 12/2012 | Sikorski | |
| 2013/0015079 | A1 | 1/2013 | Arzoumanian | |
| 2016/0068002 | A1 | 3/2016 | Keller | |
| 2017/0195736 | A1* | 7/2017 | Chai | H04N 21/4622 |
| 2017/0208911 | A1* | 7/2017 | Goldfain | A45C 11/00 |
| 2019/0387097 | A1* | 12/2019 | Li | H04W 4/16 |
| 2020/0130980 | A1* | 4/2020 | Wold | E04F 21/1655 |

* cited by examiner

*Primary Examiner* — Eileen M Adams

(57) ABSTRACT

A mountable video player apparatus for placing video content in photo albums, scrap books, year books, and art includes a housing having a housing front side, a housing back side, a housing top side, a housing bottom side, a housing left side, and a housing right side defining a housing inside. An adhesive layer is coupled to the housing back side to secure the apparatus to a page. A CPU is coupled within the housing inside. A memory chip and a battery are coupled within the housing inside and are in operational communication with the CPU. A display screen is coupled to the housing front side and is in operational communication with the CPU. A plurality of control buttons is coupled within the housing front side and is in operational communication with the CPU.

12 Claims, 5 Drawing Sheets

MOUNTABLE VIDEO PLAYER APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to video players and more particularly pertains to a new video player for placing video content in photo albums, scrap books, year books, and art.

(2) Description of Related Art Including Information Disclosed Under 37 CFR 1.97 and 1.98

The prior art relates to video players and multimedia books. Existing devices often incorporate automatic playback and have limited or no control directly on the device. Other devices utilize touch screens and have an inherently high cost. No existing devices provide easy operation and manipulation with entirely physical buttons.

BRIEF SUMMARY OF THE INVENTION

An embodiment of the disclosure meets the needs presented above by generally comprising a housing having a housing front side, a housing back side, a housing top side, a housing bottom side, a housing left side, and a housing right side defining a housing inside. An adhesive layer is coupled to the housing back side and configured to secure the apparatus to a page. A CPU is coupled within the housing inside. A memory chip and a battery are coupled within the housing inside and are in operational communication with the CPU. A display screen is coupled to the housing front side and is in operational communication with the CPU. A plurality of control buttons is coupled to the housing. Each control button is coupled within the housing front side and is in operational communication with the CPU.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
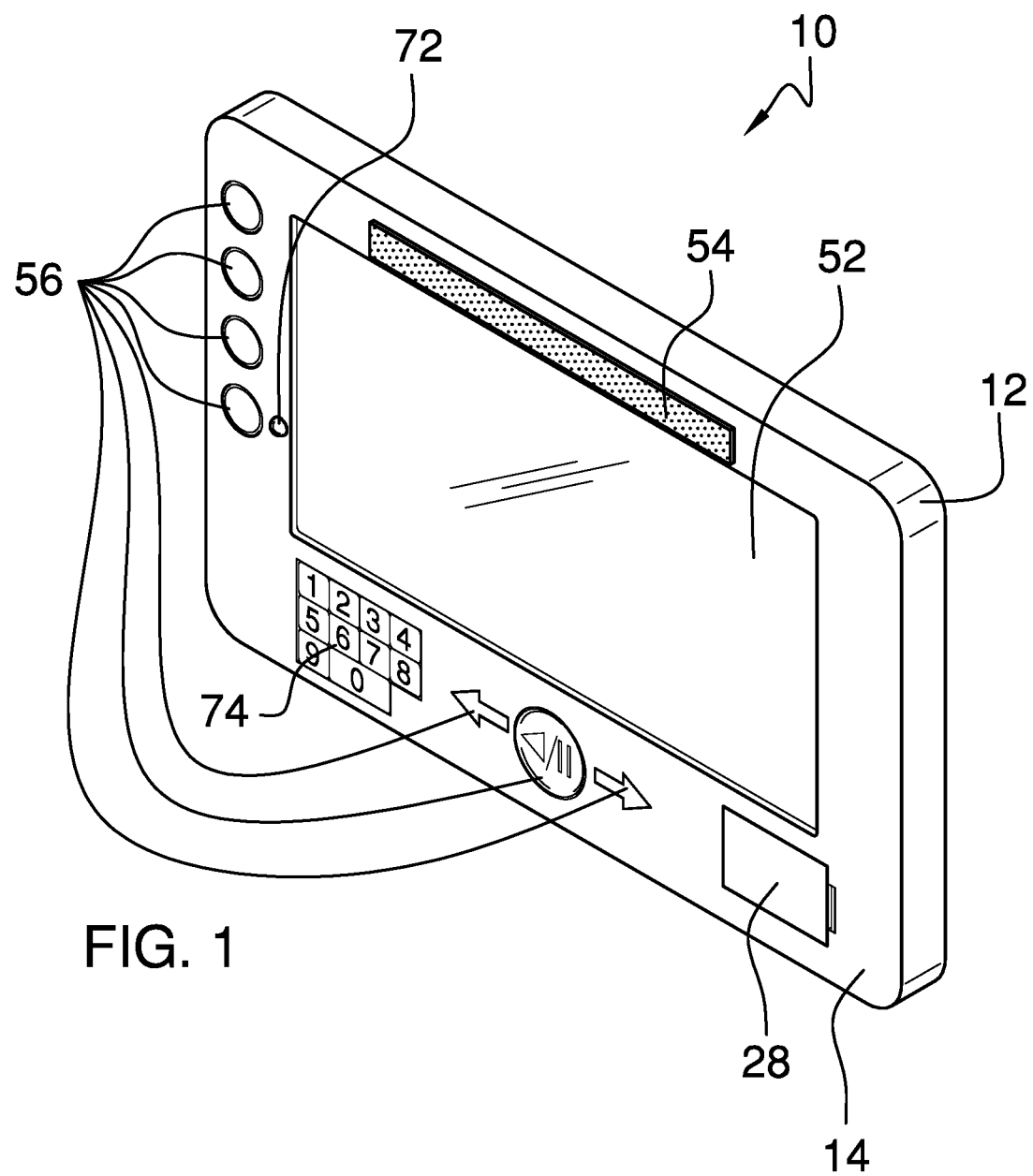
FIG. 1 is an isometric view of a mountable video player apparatus according to an embodiment of the disclosure.
Figure 2:
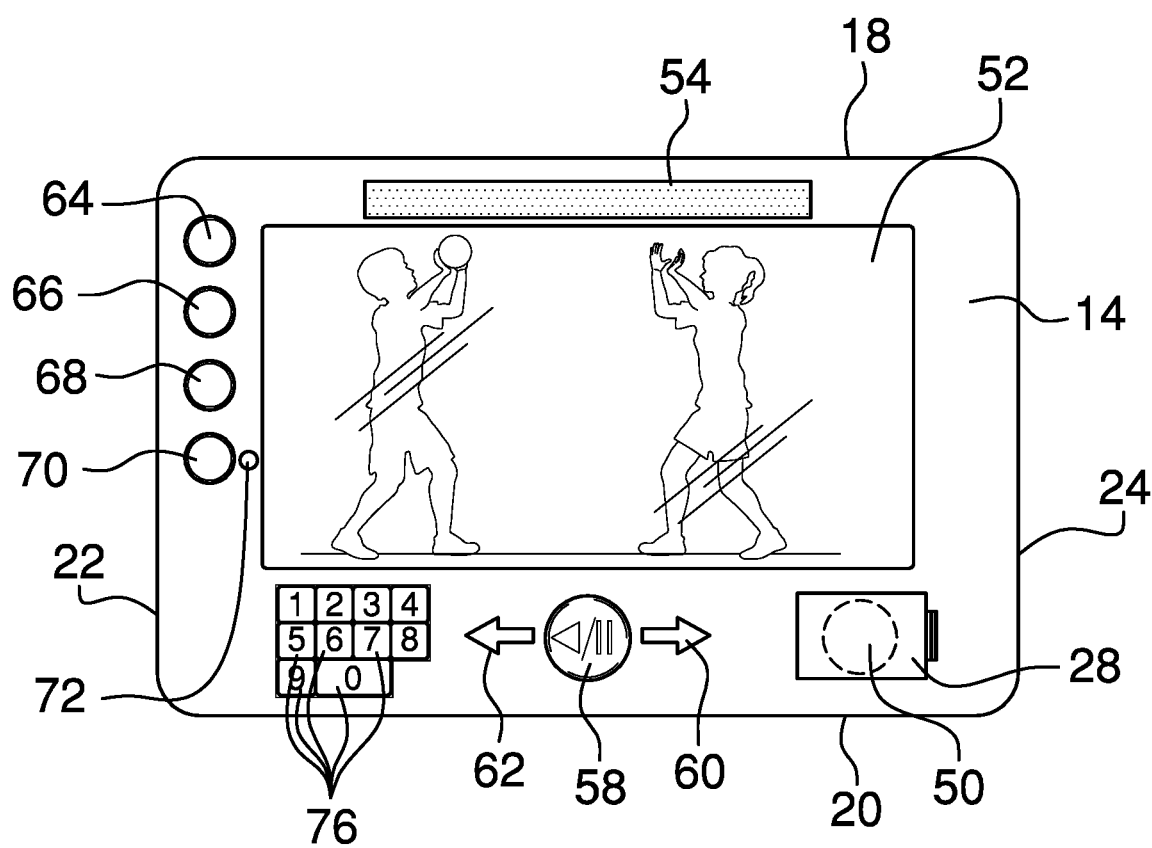
FIG. 2 is a front elevation view of an embodiment of the disclosure.
Figure 3:
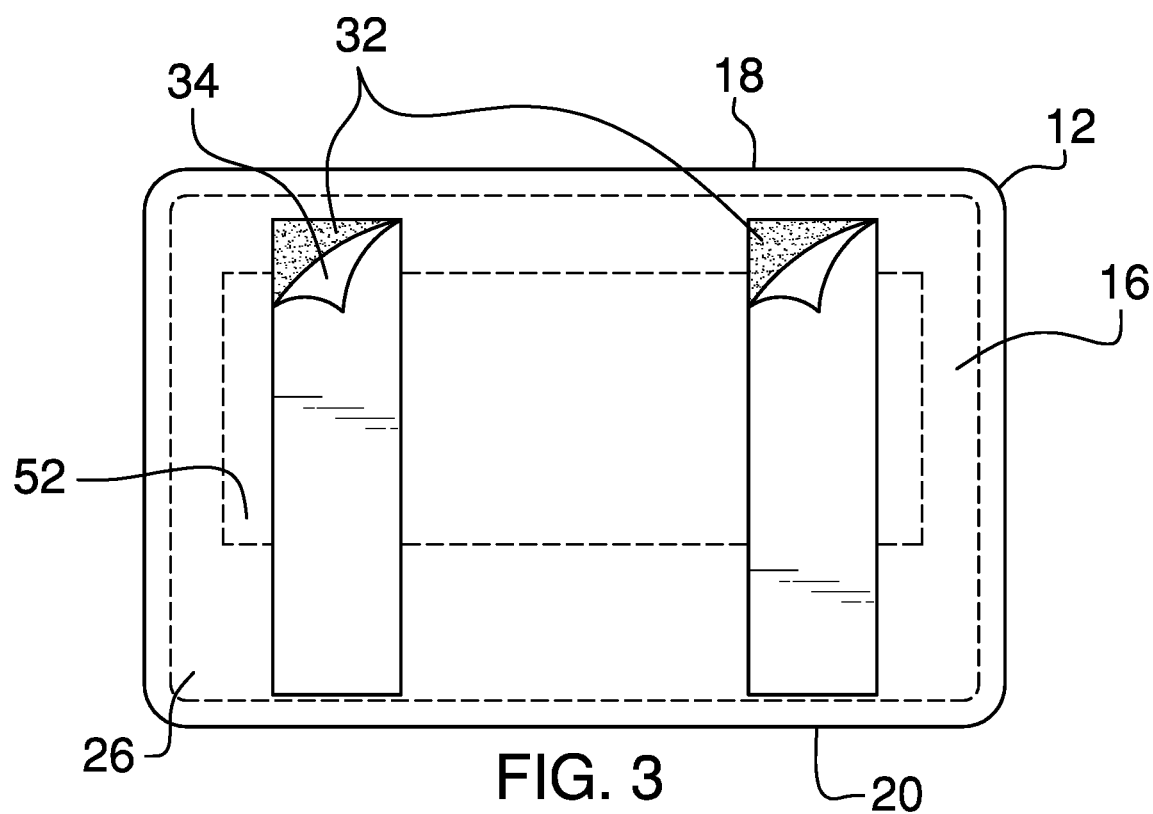
FIG. 3 is a rear elevation view of an embodiment of the disclosure.
Figure 4:
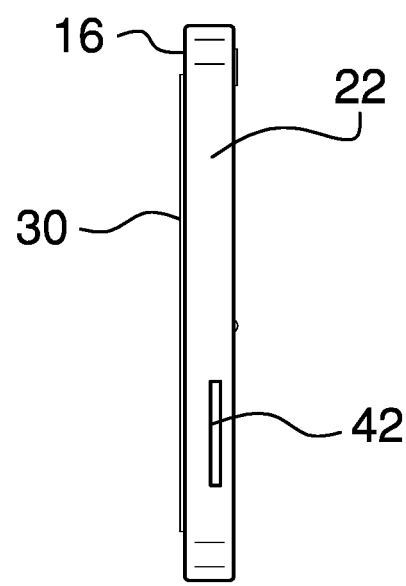
FIG. 4 is a side elevation view of an embodiment of the disclosure.
Figure 5:
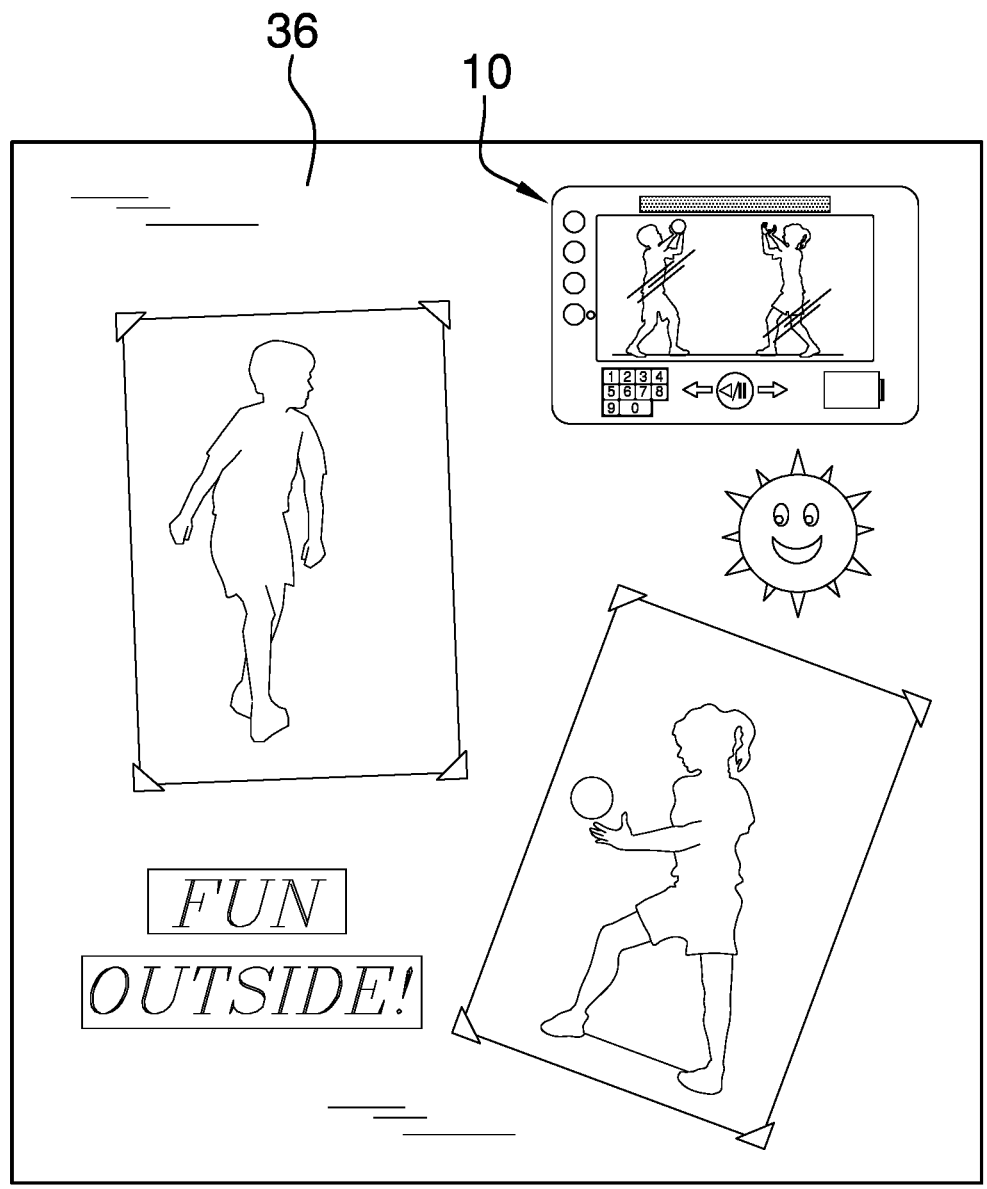
FIG. 5 is an in-use view of an embodiment of the disclosure.
Figure 6:
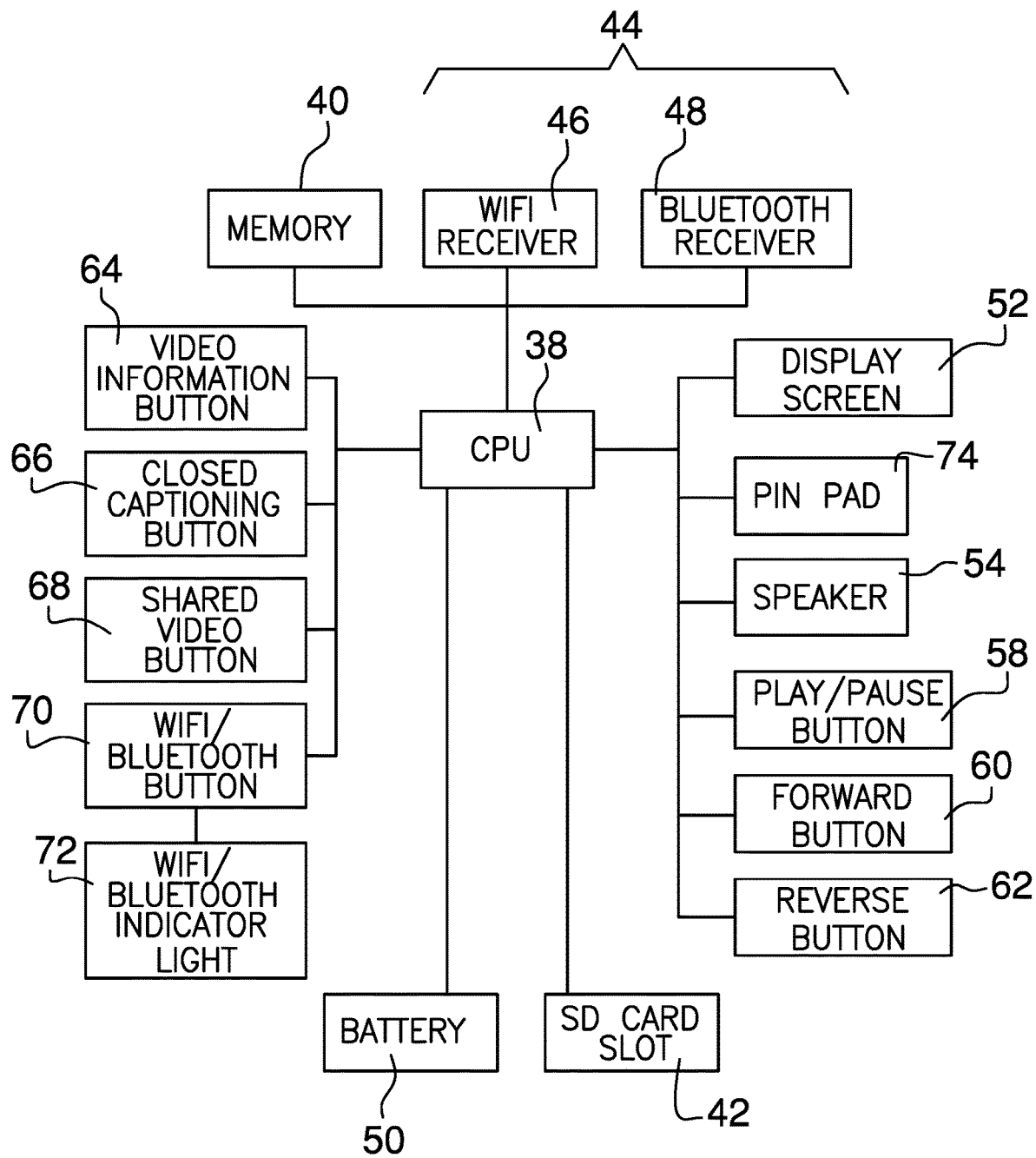
FIG. 6 is a block diagram of an embodiment of the disclosure.

With reference now to the drawings, and in particular to FIGS. 1 through 6 thereof, a new video player embodying the principles and concepts of an embodiment of the disclosure and generally designated by the reference numeral 10 will be described.

As best illustrated in FIGS. 1 through 6, the mountable video player apparatus 10 generally comprises a housing 12 having a housing front side 14, a housing back side 16, a housing top side 18, a housing bottom side 20, a housing left side 22, and a housing right side 24 defining a housing inside 26. The housing front side 14 may have a removable battery cover 28 to expose and alternatively cover the housing inside 26. The housing front side 14 and the housing back side 16 may have rounded corners. The housing 12 is as thin as allowable to allow installation within a book.

An adhesive layer 30 is coupled to the housing back side 16. The adhesive layer 30 may comprise a pair of parallel adhesive strips 32. Each adhesive strip 32 has a removable backing 34 to prevent accidental adhesion before installation. The adhesive layer 30 is configured to secure the apparatus 10 to a page 36 of a photo album, scrap book, artwork, or the like.

A CPU 38 is coupled within the housing inside 26. A memory chip 40 is coupled within the housing inside 26 and is in operational communication with the CPU 38. A memory card slot 42 may be coupled within the housing left side 22 and is in operational communication with the CPU 38. The memory card slot 42 is configured to receive a memory card such as an SD card or a SIM card. A transceiver 44 is coupled within the housing inside 26 and is in operational communication with the CPU 38. The transceiver 44 may comprise a Wi-Fi chip 46 and a Bluetooth chip 48. A battery 50 is coupled within the housing inside 26 adjacent the removable battery cover 28 and is in operational communication with the CPU 38.

A display screen 52 is coupled to the housing front side 14. The display screen 52 is in operational communication with the CPU 38 to reproduce video stored on the memory chip 40 or read from the memory card slot 42. A speaker 54 is coupled to the housing front side 14 and is in operational communication with the CPU 38 to reproduce sound from the video. The speaker 54 may be coupled between the display screen 52 and the housing top side 18.

A plurality of control buttons 56 is coupled to the housing 12. Each control button 56 may be coupled within the housing front side 14 and is in operational communication with the CPU 38. Each control button 56 is positioned to be either flush or recessed relative the housing front side 14 in order to minimize the thickness of the apparatus 10 and to prevent accidental activation. The plurality of control buttons 56 may comprise a play/pause button 58, a fast-forward button 60, a rewind button 62, a video information button 64, a closed captioning button 66, a share video button 68, and a Wi-Fi/Bluetooth button 70.

The play/pause button 58 may be medially coupled between the display screen 52 and the housing bottom side 20. The fast-forward button 60 and the rewind button 62 may be positioned on each side of the play/pause button 58 and may be arrow-shaped to indicate their use without further instruction. The video information button 64, the closed captioning button 66, the share video button 68, and the Wi-Fi/Bluetooth button 70 may be positioned in a column between the display screen 52 and the housing left side 22. A status light 72 is coupled to the housing front side 14 adjacent the Wi-Fi/Bluetooth button 70 and is in operational communication with the Wi-Fi/Bluetooth button 70 to show when the transceiver 44 is on, off, connected, or searching for connection.

A PIN pad 74 is coupled to the housing front side 14 and is in operational communication with the CPU 38 to allow the user to either secure the video or let the video be automatically played by engaging the play/pause button 58. The PIN pad 74 may include a plurality of individual numeric buttons 76.

In use, the adhesive layer 30 is used to mount the apparatus 10 on the desired page 36. The user may then use the plurality of control buttons 56 to view the video without having to navigate a menu or search through an album on a personal electronic device. The video information button 64 may be depressed to show when and where the video was taken, along with any other stored information. The closed captioning button 66 may be depressed to cycle through subtitles of the video in a number of different languages. The share video button 68 may be used to transmit the video using the transceiver 44 to a personal electronic device. The Wi-Fi/Bluetooth button may be used to turn the Wi-Fi chip 46 and the Bluetooth chip 48 on and off and to make new connections.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A mountable video player apparatus comprising:
a housing having a housing front side, a housing back side, a housing top side, a housing bottom side, a housing left side, and a housing right side defining a housing inside;
an adhesive layer coupled to the housing back side, the adhesive layer being configured to secure the apparatus to a page;
a CPU coupled within the housing inside;
a memory chip coupled within the housing inside, the memory chip being in operational communication with the CPU;
a battery coupled within the housing inside, the battery being in operational communication with the CPU;
a display screen coupled to the housing, the display screen being coupled to the housing front side, the display screen being in operational communication with the CPU;
a plurality of control buttons coupled to the housing, each control button being coupled within the housing front side and in operational communication with the CPU;
a transceiver coupled within the housing inside, the transceiver being in operational communication with the CPU; and
the plurality of control buttons comprising a play/pause button, a fast-forward button, a rewind button, a video information button, a closed captioning button, a share video button, and a Wi-Fi/Bluetooth button.

2. The mountable video player apparatus of claim 1 further comprising a speaker coupled to the housing, the speaker being coupled to the housing front side and being in operational communication with the CPU.

3. The mountable video player apparatus of claim 1 further comprising a memory card slot coupled within the housing left side, the memory card slot being in operational communication with the CPU and configured to receive a memory card.

4. The mountable video player apparatus of claim 1 further comprising the housing front side having a removable battery cover; the battery being coupled within the housing inside adjacent the removable battery cover.

5. The mountable video player apparatus of claim 1 further comprising the transceiver comprising a Wi-Fi chip and a Bluetooth chip.

6. The mountable video player apparatus of claim 1 further comprising the plurality of control buttons comprising a play/pause button, a fast-forward button, a rewind button, a video information button, and a closed captioning button.

7. The mountable video player apparatus of claim 1 further comprising a status light coupled to the housing front side adjacent the Wi-Fi/Bluetooth button, the status light being in operational communication with the Wi-Fi/Bluetooth button.

8. The mountable video player apparatus of claim 1 further comprising a PIN pad coupled to the housing front side, the PIN pad being in operational communication with the CPU to allow a user to either secure the video or let the video be automatically played by engaging the play/pause button.

9. The mountable video player apparatus of claim 1 further comprising the adhesive layer comprising a pair of parallel adhesive strips.

10. The mountable video player apparatus of claim 1 further comprising
the housing front side and the housing back side having rounded corners.

11. A mountable video player apparatus comprising:
a housing having a housing front side, a housing back side, a housing top side, a housing bottom side, a housing left side, and a housing right side defining a housing inside;
an adhesive layer coupled to the housing back side, the adhesive layer being configured to secure the apparatus to a page, the adhesive layer comprising a pair of parallel adhesive strips, each adhesive strip having a removable backing;
a CPU coupled within the housing inside;
a memory chip coupled within the housing inside, the memory chip being in operational communication with the CPU;
a battery coupled within the housing inside, the battery being in operational communication with the CPU;
a display screen coupled to the housing, the display screen being coupled to the housing front side, the display screen being in operational communication with the CPU; and
a plurality of control buttons coupled to the housing, each control button being coupled within the housing front side and in operational communication with the CPU.

12. A mountable video player apparatus comprising:
a housing having a housing front side, a housing back side, a housing top side, a housing bottom side, a housing left side, and a housing right side defining a housing inside, the housing front side having a removable battery cover, the housing front side and the housing back side having rounded corners;
an adhesive layer coupled to the housing back side, the adhesive layer comprising a pair of parallel adhesive strips, each adhesive strip having a removable backing, the adhesive layer being configured to secure the apparatus to a page;
a CPU coupled within the housing inside;
a memory chip coupled within the housing inside, the memory chip being in operational communication with the CPU;
a memory card slot coupled within the housing left side, the memory card slot being in operational communication with the CPU and configured to receive a memory card;
a transceiver coupled within the housing inside, the transceiver being in operational communication with the CPU, the transceiver comprising a Wi-Fi chip and a Bluetooth chip;
a battery coupled within the housing inside, the battery being coupled adjacent the removable battery cover, the being in operational communication with the CPU;
a display screen coupled to the housing, the display screen being coupled to the housing front side, the display screen being in operational communication with the CPU;
a speaker coupled to the housing, the speaker being coupled to the housing front side and being in operational communication with the CPU;
a plurality of control buttons coupled to the housing, each control button being coupled within the housing front side and in operational communication with the CPU, the plurality of control buttons comprising a play/pause button, a fast-forward button, a rewind button, a video information button, a closed captioning button, a share video button, and a Wi-Fi/Bluetooth button;
a status light coupled to the housing front side adjacent the Wi-Fi/Bluetooth button, the status light being in operational communication with the Wi-Fi/Bluetooth button; and
a PIN pad coupled to the housing front side, the PIN pad being in operational communication with the CPU to allow a user to either secure the video or let the video be automatically played by engaging the play/pause button.

* * * * *